United States Patent
Oomoto et al.

(10) Patent No.: US 8,882,601 B2
(45) Date of Patent: Nov. 11, 2014

(54) DAMPER DEVICE AND IMAGE FORMING APPARATUS

(75) Inventors: Noboru Oomoto, Toyokawa (JP); Shoichi Yoshikawa, Okazaki (JP); Tadayasu Sekioka, Toyohashi (JP); Yoshiyuki Toso, Toyokawa (JP); Takashi Fujiwara, Hachioji (JP); Naoki Miyagawa, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 241 days.

(21) Appl. No.: 13/483,532

(22) Filed: May 30, 2012

(65) Prior Publication Data
US 2012/0308266 A1 Dec. 6, 2012

(30) Foreign Application Priority Data
Jun. 1, 2011 (JP) ................................. 2011-123379

(51) Int. Cl.
  *F16D 3/62* (2006.01)
  *F16F 15/124* (2006.01)
  *G03G 15/00* (2006.01)

(52) U.S. Cl.
  CPC ............ *F16F 15/124* (2013.01); *G03G 15/757* (2013.01)
  USPC .......................................................... 464/85

(58) Field of Classification Search
  USPC ......... 464/69, 83, 85, 87, 903, 7, 24; 399/167
  See application file for complete search history.

(56) References Cited

U.S. PATENT DOCUMENTS

| 1,894,507 | A | * | 1/1933 | Ainsworth | 464/69 |
| 3,709,000 | A | * | 1/1973 | Persson | 464/87 |
| 4,040,270 | A | * | 8/1977 | Chivari | 464/69 |
| 5,857,712 | A | * | 1/1999 | Kato | |
| 6,023,596 | A | | 2/2000 | Makino | |
| 2005/0075173 | A1 | | 4/2005 | Kotsusa | |

FOREIGN PATENT DOCUMENTS

| DE | 820 349 | * 11/1951 | ..................... 464/85 |
| JP | 48-018908 Y1 | 5/1973 | |
| JP | 60-143239 A | 7/1985 | |
| JP | 60-227015 A | * 11/1985 | ..................... 464/69 |

(Continued)

OTHER PUBLICATIONS

Office Action (Notification of Reasons for Refusal) issued on Sep. 10, 2013, by the Japanese Patent Office in corresponding Japanese Patent Application No. 2011-123379, and an English Translation of the Office Action. (7 pages).

*Primary Examiner* — Gregory Binda
(74) *Attorney, Agent, or Firm* — Buchanan Ingersoll & Rooney PC (57) ABSTRACT

A damper device having: an input member into which a rotary drive force is inputted; an output member which rotates in accordance with the inputted rotary drive force; a columnar viscoelastic member provided between the input member and the output member; a driving-side pressing member which is attached to the input member and which applies a pressing force on one end surface of the viscoelastic member in accordance with the inputted drive force; a passive-side pressing member which is attached to the output member and which receives a pressing force from the other end surface of the viscoelastic member; a first supporting member which supports the driving-side pressing member such that the driving-side pressing member can turn freely relative to the input member; and a second supporting member which supports the passive-side pressing member such that the passive-side pressing member can turn freely relative to the output member.

8 Claims, 5 Drawing Sheets

(56) References Cited

FOREIGN PATENT DOCUMENTS

| | | | |
|---|---|---|---|
| JP | 05-047605 U | 6/1993 | |
| JP | 07-140842 A | 6/1995 | |
| JP | 11-095612 A | 4/1999 | |
| JP | 2002-174932 A | 6/2002 | |
| JP | 2003-214455 A | 7/2003 | |
| SU | 456930 * | 1/1975 | ............ 464/85 |

* cited by examiner

DAMPER DEVICE AND IMAGE FORMING APPARATUS

This application is based on Japanese Patent Application No. 2011-123379 filed on Jun. 1, 2011, the content of which is incorporated herein by reference.

BACKGROUND OF THE INVENTION

1. Field of the Invention

The present invention relates to a damper device, especially to a damper device arranged in a place where an inputted force for rotary motion or linear motion is transmitted to an output member, and an image forming apparatus such as a copier or a printer.

2. Description of Related Art

Generally, in an electrophotographic image forming apparatus, a rotary drive for an image forming process requires highly-accurate transmission of a rotative force. However, a rotary drive system includes factors of load fluctuations in a rotating direction or vibrations (speed fluctuations) in the rotating direction, such as a motor and engagements between gears, which inhibits an improvement in accuracy of the transmission of the rotative force. Meanwhile, simplification of the system for transmitting a rotative force has been demanded so as to reduce the cost, and for realizing this, vibrations (speed fluctuations) that occur upstream from the drive system need to be effectively blocked by a simple means so as not to be transmitted to downstream.

Japanese Patent Laid-Open Publication No. 2002-174932 describes a drive system including a brushless motor that generates motive power, a photoreceptor drum that is driven to rotate by the motive power of the brushless motor, a gear train that transmits the motive power of the brushless motor to the photoreceptor drum through a plurality of gears, a rubber vibration isolator that is located between the gears so as to prevent transmission of vibrations to the photoreceptor drum, and a photoreceptor gear that is provided in the photoreceptor drum and connected to the gear.

However, the vibration isolating measure described in Japanese Patent Laid-Open Publication No. 2002-174932 is not necessarily preferable in terms of simplification of the structure as well as effects, and a more effective measure to isolate vibrations has been desired.

SUMMARY OF THE INVENTION

A damper device according to a first aspect of the present invention comprises: an input member into which a rotary drive force is inputted; an output member which rotates in accordance with the rotary drive force transmitted from the input member; a columnar viscoelastic member which is provided between the input member and the output member; a driving-side pressing member which is attached to the input member and which applies a pressing force to one end surface of the viscoelastic member in accordance with the inputted drive force; a passive-side pressing member which is attached to the output member and which receives a pressing force from the other end surface of the viscoelastic member; a first supporting member which supports the driving-side pressing member such that the driving-side pressing member is capable of turning freely relative to the input member; and a second supporting member which supports the passive-side pressing member such that the passive-side pressing member is capable of turning freely relative to the output member.

An image forming apparatus according to a second aspect of the present invention comprises: an image forming section for forming an image on a recording sheet; and a damper device employed in a rotary drive mechanism for the image forming section, the damper device comprising: an input member into which a rotary drive force is inputted; an output member which rotates in accordance with the rotary drive force transmitted from the input member; a columnar viscoelastic member which is provided between the input member and the output member; a driving-side pressing member which is attached to the input member and which applies a pressing force to one end surface of the viscoelastic member in accordance with the inputted drive force; a passive-side pressing member which is attached to the output member and which receives a pressing force from the other end surface of the viscoelastic member; a first supporting member which supports the driving-side pressing member such that the driving-side pressing member is capable of turning freely relative to the input member; and a second supporting member which supports the passive-side pressing member such that the passive-side pressing member is capable of turning freely relative to the output member.

BRIEF DESCRIPTION OF THE DRAWINGS

This and other features of the present invention will be apparent from the following description with reference to the accompanying drawings, in which:

FIGS. 2A and 2B show a damper device according to a first embodiment, where

FIGS. 3A and 3B show the damper device, where

FIG. 5A1 to 5C2 are views showing simulation results showing the behaviors of viscoelastic members; and FIGS. 6A and 6B show a damper device according to a second embodiment, where

DETAILED DESCRIPTION OF THE PREFERRED EMBODIMENTS

Hereinafter, embodiments of a damper device and an image forming apparatus according to the present invention will be described with reference to the attached drawings. It should be noted that in each of the figures, the same member or portion is provided with a common reference symbol, and a description thereof will not be repeated.

Overall Structure of Image Forming Apparatus; See FIG. 1

Figure 1:
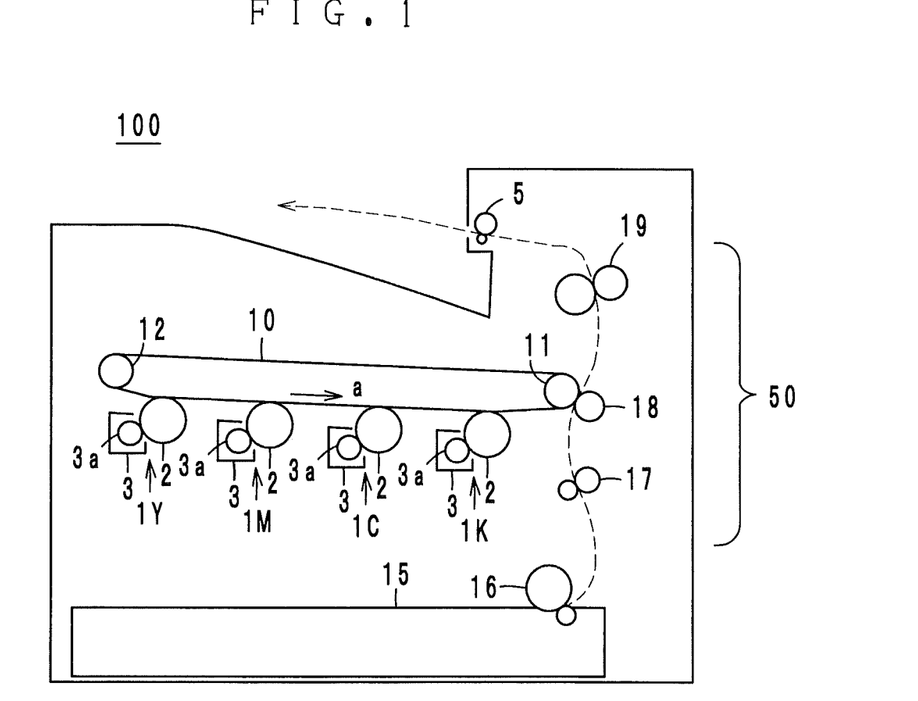
FIG. 1 is a schematic constitutional view showing an image forming apparatus.

As shown in FIG. 1, the image forming apparatus 100 is configured as a color printer of a tandem type. The image forming apparatus 100 has an image forming section 50 of a structure described below, and the image forming section 50 forms a color image on a recording medium. In the image forming section 50, image forming units 1Y, 1M, 1C and 1K for forming images of Y (yellow), M (magenta), C (cyan) and K (black) are arranged in parallel immediately below an intermediate transfer belt 10. Each of the image forming units 1Y, 1M, 1C and 1K has a known configuration where a development device 3 and other devices are arranged with a photoreceptor drum 2 at the center. The intermediate transfer belt 10 is extended in an endless state between support rollers 11 and 12, and is driven rotate in a direction shown by arrow a. Toner images formed on the respective photoreceptor drums 2 are transferred on the intermediate transfer belt 10 sequentially (primary transfer) to be synthesized into a color image.

Sheets of paper (recording medium) are loaded in a paper feeding tray 15 and fed one by one by a paper feeding roller 16. Then, the fed sheet passes through a nip part between the intermediate transfer belt 10 and a secondary transfer roller 18 via a timing roller pair 17 so that the color image can be transferred from the intermediate transfer belt 10 onto the sheet. Thereafter, the sheet is carried to a fixation unit 19, where the toner image is fixed on the sheet by heat, and then is ejected to the upper surface of the body through an ejection roller pair 5.

It is to be noted that the image forming apparatus is not necessarily a color printer as described above and may be a black-and-white printer. Also, the image forming apparatus may be selected from various types, such as a type of copiers provided with an image reading unit and a type of apparatuses provided with a facsimile function and/or a communication function with the Internet.

A damper device according to the present invention can be employed in a drive mechanism for each of the image forming units (the photoreceptor 2 and a development roller 3a of the development device 3) and a drive mechanism for the roller 11 that drives the intermediate transfer belt 10.

First Embodiment

See FIGS. 2A to 5

Figure 2A:
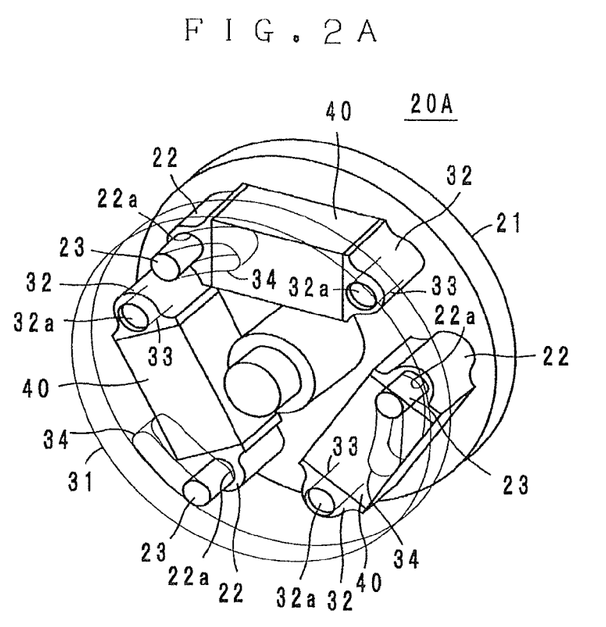
FIG. 2A is a perspective view showing a stopped state.
Figure 2B:
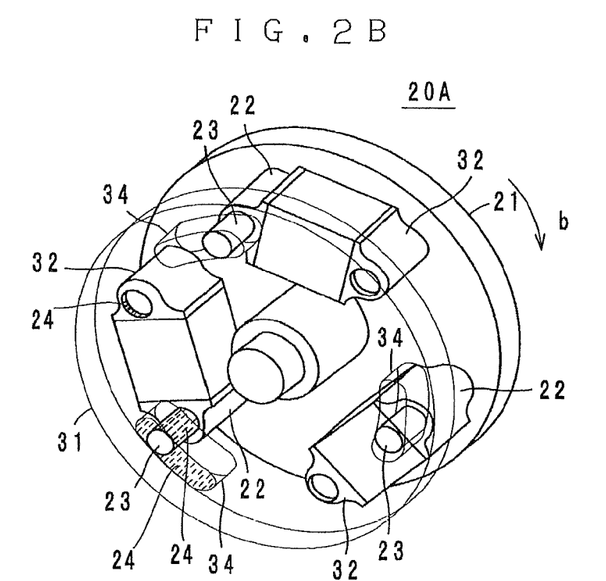
FIG. 2B is a perspective view showing a rotating state.

As shown in FIG. 1 and FIGS. 2A and 2B, a damper device 20A as a first embodiment essentially comprises a disk-like input member 21, an output member 31 and columnar viscoelastic member's 40. Into the input member 21, a rotary drive force in a direction shown by arrow b is inputted. The output member 31 receives the rotary drive force from the input member 21 and rotates in the direction shown by arrow b. The columnar viscoelastic members 40 are provided between the input member 21 and the output member 31.

One end surface of each of the columnar viscoelastic members 40 is bonded and fixed to a driving-side pressing member 22, and with the inputted drive force, the driving-side pressing member 22 applies a pressing force to the one end surface. A hole 22a is made in the driving-side pressing member 22, and a first supporting member attached to the input member 21 (a first pivot 23 standing on the input member 21) is inserted in the hole 22a of the driving-side pressing member 22 such that the driving-side pressing members 22 is capable of turning freely on the first pivot 23. Further, the other end surface of each of the columnar viscoelastic members 40 is bonded and fixed to a passive-side pressing member 32, and the passive-side pressing member 32 receives a pressing force from the columnar viscoelastic member 40. A hole 32a is made in the passive-side pressing member 32, and a second supporting member attached to the output member 31 (a second pivot 33 standing on the output member 31) is inserted in the hole 32a of the passive-side pressing member 32 such that the passive-side pressing member 32 is capable of turning freely on the second pivot 33. In an illustrative embodiment according to the present invention as shown in FIG. 2B, lubricant 24 is provided between the first pivot 23 and the hole 22a, and between the second pivot 33 and the hole 32a.

The first pivots 23, which pierce through the holes 22a of the respective driving-side pressing members 22, protrude from the driving-side pressing members 22 to the output member 31. Arc-like long holes 34 are formed in the output member 31, and the arc-like long holes 34 receive the protruding portions of the driving-side pressing members 22, respectively, and guide the protruding portions in a rotating direction.

Figure 3A:
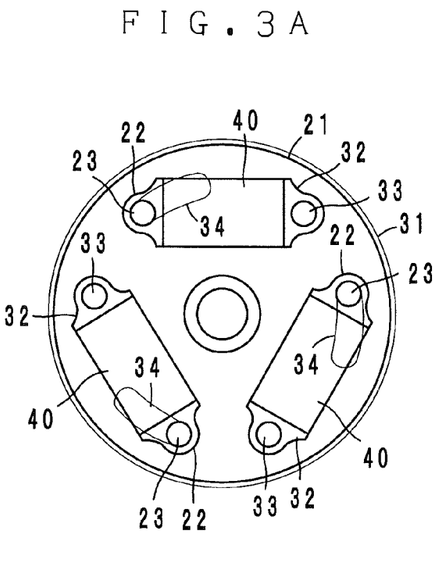
FIG. 3A is a front view showing the stopped state.
Figure 3B:
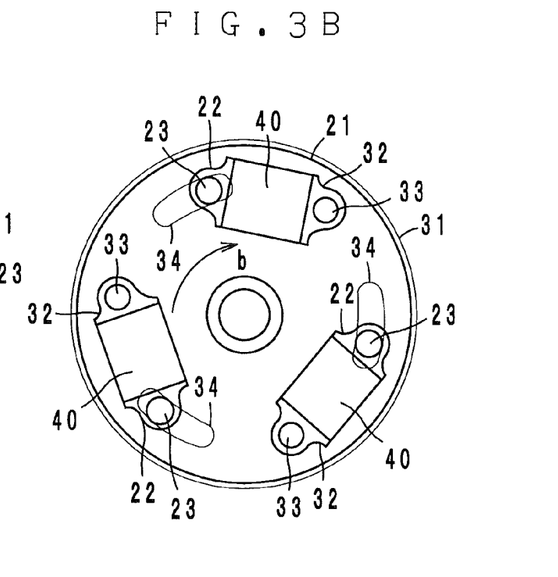
FIG. 3B is a front view showing the rotating state.

As shown in FIGS. 3A and 3B, the viscoelastic members 40 are allocated in three parts that are equally divided in the circumferential direction of the input member 21 and the output member 31. Although the number of the viscoelastic members 40 is not restricted to three, the equally-spaced arrangement of three viscoelastic members 40 provides the most favorable balance.

In the damper device 20A of the above structure, the viscoelastic members 40 stay expanded by their own elasticity under a stopped state, as shown in FIG. 3A. Upon input of a rotary drive force into the input member 21 in a direction shown by arrow b, the driving-side pressing members 22 move in the direction shown by arrow b via the first pivots 23, while being guided by the long holes 34. Accordingly, the driving-side pressing members 22 apply pressing forces to the end surfaces of the columnar viscoelastic members 40. Thereby, the viscoelastic members 40 contract and apply the pressing force to the passive-side pressing members 32 via the other end surfaces (see FIG. 3B). Then, the rotary drive force is transmitted from the passive-side pressing members 32 to the output member 31 via the second pivots 33.

Microvibrations (speed fluctuations) inputted into the input member 21 are absorbed by the viscoelastic members 40 due to the elasticity thereof and are not transmitted to the output member 31. That is, vibrations are blocked by the viscoelastic members 40 provided between the input member 21 and the output member 31. The driving-side pressing members 22 that apply a pressing force to respective one end surfaces of the viscoelastic members 40 are supported by the first pivots 23 in such a manner to be capable of turning freely relative to the input member 21, and the passive-side pressing members 32 that receive the pressing force from the respective other end surfaces of the viscoelastic members 40 are supported by the second pivots in such a manner to be capable of turning freely relative to the output member 31. Thereby, each of the viscoelastic members 40 contracts and expands with its both end surfaces kept in a parallel state, to effectively absorb vibration energy. That is, each of the viscoelastic members 40 is compressed with the end surfaces thereof kept in an almost parallel state, and inner stress thereof is uniformly distributed. Thereby, neither buckling nor imbalance of the pressing force occurs.

Figure 4:
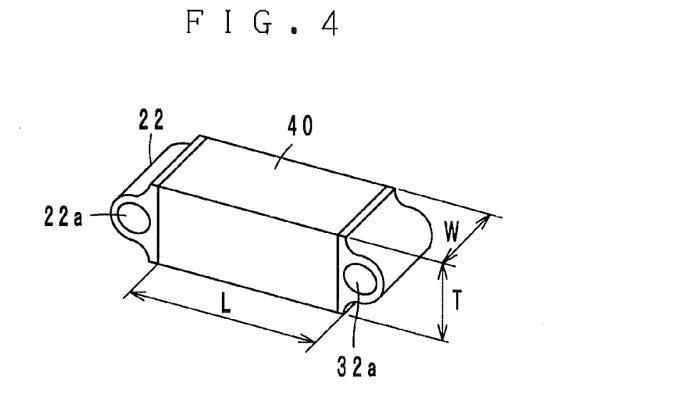
FIG. 4 is a perspective view of a viscoelastic member provided with a pressing member at each end thereof.

In the following, more specific examples of the damper device 20A and behaviors of the viscoelastic members 40 will be described with reference to FIGS. 4 and 5.

For the viscoelastic members 40, there can be suitably used rubber having an Asker C hardness of 30 and a Young's modulus E of 0.65 MPa. For the pressing members 22 and 32, there can be suitably used POM (polyoxymethylene) having a Young's modulus E of 2580 MPa. With regard to the dimensions of the viscoelastic members 40, as shown in FIG. 4, each viscoelastic member 40 preferably has a length L of 38 mm, a width W of 10 mm and a height T of 10 mm.

Figure 5A:
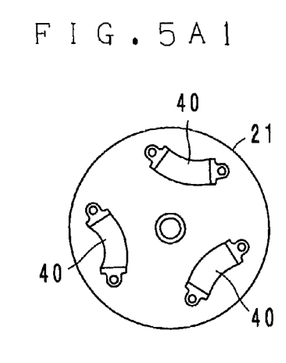
Figure 5A:
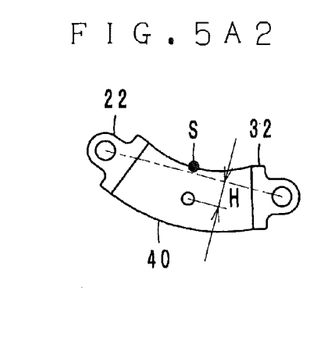
Figure 5B:
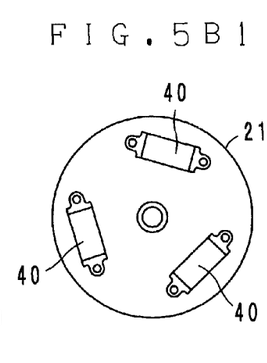
Figure 5B:
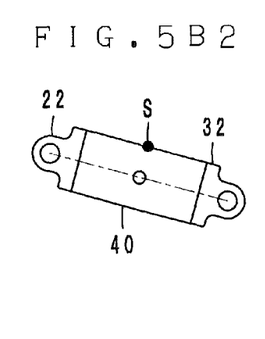
Figure 5C:
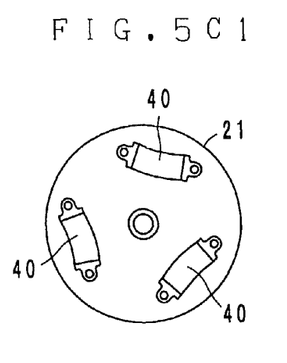
Figure 5C:
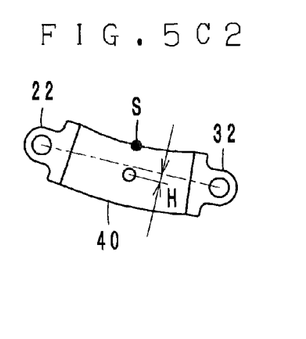

A simulation was performed by using a damper device according to this embodiment. In the damper device, the viscoelastic members 40, and the pressing members 22 and 32 were made of the above materials and shaped into the above dimensions, and the frictional forces between the first pivots and the holes 22a and between the second pivots 33 and the holes 32a were set to zero (it shall be assumed that a lubricant, preferably grease, was provided between the first pivots 23 and the holes 22a and between the second pivots 33 and the holes 32a). A rotary drive force was applied to the input member 21, while the output member 31 was in a fixed state. As a result, as shown in FIG. 5B1, each of the viscoelastic members 40 contracted/expanded with both end surfaces thereof kept in a parallel state, and buckling did not occur. As shown in FIG. 5B2, the displacement of the center of each viscoelastic member 40 was 0, and the stress at the anti-node S in a contraction period was 0.25 MPa.

For comparison, while the first and the second pivots 23 and 33 are fixed to the corresponding holes 22a and 32a such that the pressing members 22 and 32 cannot turn on the pivots 23 and 33, a simulation was performed by applying a rotary drive force to the input member 21. As a result, as shown in FIG. 5A1, each of the viscoelastic members 40 relatively significantly bent. As shown in FIG. 5A2, the displacement H of the center of each viscoelastic member 40 was 3.45 mm, and the stress at the anti-node S in a contraction period was 0.3 MPa. Further, by using a damper device according to this embodiment with no lubricant provided between the first pivots 23 and the holes 22a and between the second pivots 32 and the holes 32a, whereby a certain degree of frictional force occurs between each pair of a pivot 22 or 32 and a hole 22a or 32a, a simulation was performed by applying a rotary drive force to the input member 21. As a result, as shown in FIG. 5C1, each of the viscoelastic members 40 slightly bent. As shown in FIG. 5C2, the displacement H of the center of each viscoelastic member 40 was 1.68 mm, and the stress at the anti-node S in the contraction period was 0.28 MPa.

As is apparent from the above simulation results, the first and the second pivots 23 and 33 shall be inserted in the holes 22 a and 32 a such that the driving-side pressing members 22 and the passive-side pressing members 32 are capable of turning freely on the respective first and second pivots 23 and 33. Also, it is preferred that no frictional force or only a small degree of frictional force is present between each pair of a pivot 23 or 33 and a hole 22 a or 32 a. As shown in FIGS. 5A1 and 5A2, when the first and the second pivots 23 and 33 are fixed to the corresponding holes 22 a and 32 a such that the pressing members 22 and 32 cannot turn on the pivots 23 and 33, the viscoelastic members 40 significantly bend and may buckle.

Second Embodiment

Figure 6A:
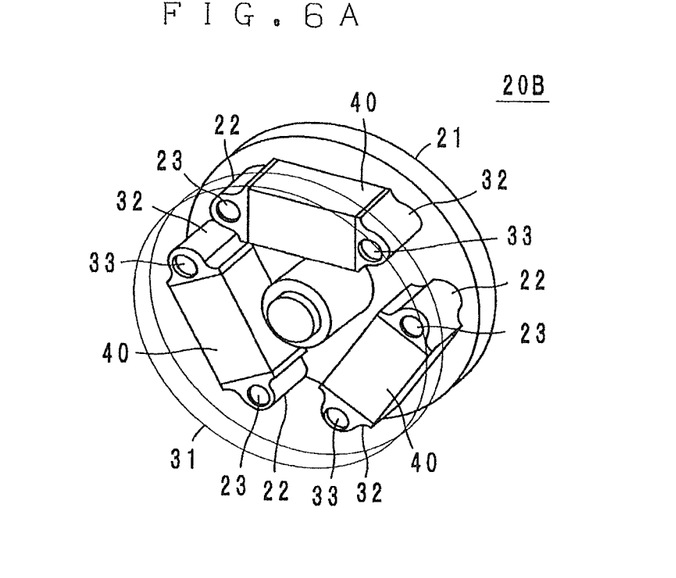
FIG. 6A is a perspective view.
Figure 6B:
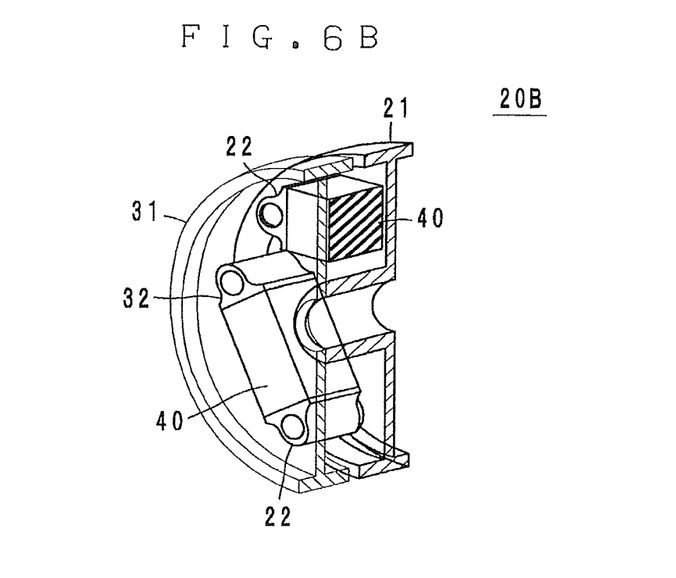
FIG. 6B is a perspective view of a half cross-section.

See FIG. 6

FIG. 6 shows a damper device 20B according to a second embodiment of the present invention. The long holes 34 that guide the first pivots 23 are omitted from the damper device 20B. The other configuration is similar to that of the first embodiment. That is, the long holes 34 are not necessarily required for the damper device.

A case is considered where the input member 21 and the output member 31 are highly accurate gear wheels for transmitting rotation highly accurately. Making long holes 34 in resin-molding such highly accurate gear wheels deteriorate the accuracy due to "sink marks" generated at the time of molding. In order to avoid this, the long holes 34 are not provided in the damper device 20B according to the second embodiment.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A damper device comprising:
   an input member into which a rotary drive force is inputted;
   an output member which rotates in accordance with the rotary drive force transmitted from the input member;
   a columnar viscoelastic member which is provided between the input member and the output member;
   a driving-side pressing member which is attached to the input member and which applies a pressing force to one end surface of the viscoelastic member in accordance with the inputted drive force;
   a passive-side pressing member which is attached to the output member and which receives a pressing force from the other end surface of the viscoelastic member;
   a first supporting member which supports the driving-side pressing member such that the driving-side pressing member is capable of turning freely relative to the input member; and
   a second supporting member which supports the passive-side pressing member such that the passive-side pressing member is capable of turning freely relative to the output member.

2. The damper device according to claim 1, wherein one end surface of the columnar viscoelastic member is bonded and fixed to the driving-side pressing member, and the other end surface thereof is bonded and fixed to the passive-side pressing member.

3. The damper device according to claim 1, wherein:
   the first supporting member is a first pivot provided on the input member;
   the second supporting member is a second pivot provided on the output member;
   the first pivot is inserted into a hole made in the driving-side pressing member such that the driving-side pressing member is capable of turning freely on the first pivot; and
   the second pivot is inserted into a hole made in the passive-side pressing member such that the passive-side pressing member is capable of turning freely on the second pivot.

4. The damper device according to claim 3, wherein a lubricant is provided between the first pivot and the hole made in the driving-side pressing member and between the second pivot and the hole made in the passive-side pressing member.

5. An image forming apparatus comprising:
   an image forming section for forming an image on a recording sheet; and
   a damper device employed in a rotary drive mechanism for the image forming section, the damper device comprising:
      an input member into which a rotary drive force is inputted;
      an output member which rotates in accordance with the rotary drive force transmitted from the input member;
      a columnar viscoelastic member which is provided between the input member and the output member;
      a driving-side pressing member which is attached to the input member and which applies a pressing force on one end surface of the viscoelastic member in accordance with the inputted drive force;
      a passive-side pressing member which is attached to the output member and which receives a pressing force from the other end surface of the viscoelastic member;

a first supporting member which supports the driving-side pressing member such that the driving-side pressing member is capable of turning freely relative to the input member; and a second supporting member which supports the passive-side pressing member such that the passive-side pressing member is capable of turning freely relative to the output member.

6. The image forming apparatus according to claim 5, wherein one end surface of the columnar viscoelastic member is bonded and fixed to the driving-side pressing member, and the other end surface thereof is bonded and fixed to the passive-side pressing member.

7. The image forming apparatus according to claim 5, wherein:

the first supporting member is a first pivot provided on the input member;

the second supporting member is a second pivot provided on the output member;

the first pivot is inserted into a hole made in the driving-side pressing member such that the driving-side pressing member is capable of turning freely on the first pivot; and the second pivot is inserted into a hole made in the passive-side pressing member such that the passive-side pressing member is capable of turning freely on the second pivot.

8. The image forming apparatus according to claim 5, wherein a lubricant is provided between the first pivot and the hole made in the driving-side pressing member and between the second pivot and the hole made in the passive-side pressing member.

\* \* \* \* \*